United States Patent
Varonier et al.

(10) Patent No.: US 10,118,532 B2
(45) Date of Patent: Nov. 6, 2018

(54) REEL HANDLER

(71) Applicant: Dejana Truck and Utility Equipment, Kings Park, NY (US)

(72) Inventors: Victor J. Varonier, Miller Place, NY (US); Arthur K. McVaugh, Green Lane, PA (US)

(73) Assignee: DEJANA TRUCK AND EQUIPMENT, Kings Park, NY (US)

( * ) Notice: Subject to any disclaimer, the term of this patent is extended or adjusted under 35 U.S.C. 154(b) by 0 days.

(21) Appl. No.: 15/649,974

(22) Filed: Jul. 14, 2017

(65) Prior Publication Data
US 2018/0015865 A1 Jan. 18, 2018

Related U.S. Application Data

(60) Provisional application No. 62/362,363, filed on Jul. 14, 2016.

(51) Int. Cl.
| | |
|---|---|
| *B60P 3/035* | (2006.01) |
| *B60P 3/22* | (2006.01) |
| *B65H 75/42* | (2006.01) |
| *B65H 75/44* | (2006.01) |
| *B65H 49/32* | (2006.01) |

(52) U.S. Cl.
CPC ............ *B60P 3/035* (2013.01); *B60P 3/2265* (2013.01); *B65H 75/425* (2013.01); *B65H 75/4457* (2013.01); *B65H 49/322* (2013.01); *H05K 999/99* (2013.01)

(58) Field of Classification Search
CPC ............................... B60P 3/035; B60P 3/2265
USPC .............. 414/547, 408, 486, 540, 546, 555
See application file for complete search history.

(56) References Cited

U.S. PATENT DOCUMENTS

| | | | | |
|---|---|---|---|---|
| 3,379,392 A | * | 4/1968 | Garnett | B60P 3/035 242/399.1 |
| 4,044,963 A | * | 8/1977 | Hostetler | A01D 87/127 242/391.1 |
| 4,594,041 A | * | 6/1986 | Hostetler | A01D 87/127 242/557 |
| 4,687,402 A | * | 8/1987 | Zatylny | A01D 87/127 414/24.5 |
| 4,722,651 A | * | 2/1988 | Antal | A01D 87/127 293/117 |

(Continued)

FOREIGN PATENT DOCUMENTS

EP 514347 A1 * 11/1992 ................ B65F 3/04

*Primary Examiner* — Kaitlin S Joerger
(74) *Attorney, Agent, or Firm* — Sorell, Lenna & Schmidt, LLP (57) ABSTRACT

A reel handler system includes a first arm and a second arm. A first member is coupled to the first arm and a second member is coupled to the second arm. A sleeve has the members movably positioned therein. A first bracket has a first link coupled to the first arm and a second link coupled to the sleeve. The links are pivotable relative to one another. A second bracket has a third link coupled to the second arm and a fourth link coupled to the sleeve. The third and fourth links are pivotable relative to one another. The brackets are movable to increase and decrease a distance between the arms from a first configuration in which the first and third links are spaced a first distance apart from the sleeve and a second configuration in which the first and third links are spaced a second distance apart from the sleeve.

20 Claims, 10 Drawing Sheets

(56) References Cited

U.S. PATENT DOCUMENTS

| | | | | |
|---|---|---|---|---|
| 4,762,291 A * | 8/1988 | Sauber | ............... | B60P 3/035 |
| | | | | 242/559 |
| 5,266,000 A * | 11/1993 | LeBlanc, Jr. | ............ | B65F 3/02 |
| | | | | 294/68.3 |
| 5,662,449 A * | 9/1997 | Krinhop | .............. | A01D 87/127 |
| | | | | 414/111 |
| 6,224,317 B1 * | 5/2001 | Kann | ..................... | B65F 3/041 |
| | | | | 414/406 |
| 9,120,636 B2 * | 9/2015 | Cavirani | ............... | B65H 19/12 |
| 2014/0056674 A1 * | 2/2014 | Smith | .................... | B60P 3/035 |
| | | | | 414/546 |
| 2015/0158692 A1 * | 6/2015 | Reynolds | ............ | B65H 75/425 |
| | | | | 242/390.2 |

* cited by examiner

REEL HANDLER

TECHNICAL FIELD

The present disclosure generally relates to devices for loading and unloading cable reels and the like from trucks, trailers or other supported beds, and in particular to reel handler devices with a primary function of lifting and loading cable reels on to a truck bed or the like.

BACKGROUND

Reel handlers have been developed to aid in lifting and loading cable reels on to a truck bed, for example. In particular, the reel handlers are designed to lift a reel off the ground so that the reel can be rotated to allow cable to be unwound from the reel or to wind cable around the reel. Conventional reel handlers may engage a reel in various ways. For example, the reel handlers may include a pair of working arms that position the reel between the arms in order to lift the reel off the ground and position the reel such that cable can be wound onto the reel or unwound from the reel, for example. One or both of the arms are movable relative to another one of the arms to space the arms apart. At least one of the arms is then moved toward the other one of the arms until the arms engage the reel. However, movement of the arms relative to one another is often difficult to control. For example, the arms may move too much or too little relative to one another. Alternatively, the arms may not move in unison. That is, one of the arms may move more or less than the other arm, making it difficult to properly couple the reel to the arms. This disclosure describes an improvement over these prior art technologies.

SUMMARY

In one embodiment, a reel handler system is provided. The reel handler system includes a first arm and a second arm. A first member is coupled to the first arm and a second member is coupled to the second arm. A sleeve has the members movably positioned therein. A first bracket has a first link coupled to the first arm and a second link coupled to the sleeve. The links are pivotable relative to one another. A second bracket has a third link coupled to the second arm and a fourth link coupled to the sleeve. The third and fourth links are pivotable relative to one another. The brackets are movable to increase and decrease a distance between the arms from a first configuration in which the first and third links are spaced a first distance apart from the sleeve and a second configuration in which the first and third links are spaced a second distance apart from the sleeve.

In one embodiment, the reel handler system is configured for use with vehicle having a platform for holding a reel and comprises a first arm and a second arm. A first member is coupled to the first arm and a second member is coupled to the second arm. A sleeve has the members movably positioned therein. A first bracket has a first link coupled to the first arm and a second link coupled to the sleeve. The links are pivotable relative to one another. A second bracket has a third link coupled to the second arm and a fourth link coupled to the sleeve. The third and fourth links are pivotable relative to one another. Hydraulic lift cylinders each comprise a piston therein. The pistons are each coupled to one of the arms such that the pistons move within the lift cylinders to move the arms about an axis defined by the sleeve in an arc. The brackets are movable to increase and decrease a distance between the arms from a first configuration in which the first and third links are spaced a first distance apart from the sleeve and a second configuration in which the first and third links are spaced a second distance apart from the sleeve. The first arm is rotatably coupled to a first carriage, the second arm is rotatably coupled to a second carriage and the reel handler further comprises a sheath that connects the first carriage to the second carriage. The sheath comprises hydraulic cylinders positioned therein. The cylinders are configured to move the first carriage relative to the second carriage to move the brackets between the first and second configurations.

In one embodiment, the reel handler comprises a vehicle having a platform, a reel and a cable reel handler. The reel handler comprises a first arm and a second arm. A first member is coupled to the first arm and a second member is coupled to the second arm. A sleeve has the members movably positioned therein. A first bracket has a first link coupled to the first arm and a second link coupled to the sleeve. The links are pivotable relative to one another. A second bracket has a third link coupled to the second arm and a fourth link coupled to the sleeve. The third and fourth links are pivotable relative to one another. Hydraulic lift cylinders each comprise a piston therein. The pistons are each coupled to one of the arms such that the pistons move within the lift cylinders to move the arms about an axis defined by the sleeve in an arc. The brackets are movable to increase and decrease a distance between the arms from a first configuration in which the first and third links are spaced a first distance apart from the sleeve and a second configuration in which the first and third links are spaced a second distance apart from the sleeve. The arms are movable about an axis that is parallel to the sleeve in an arc. The arms are movable when the brackets are in the second configuration from a first position in which the reel engages the platform to a second position in which the reel is positioned above the platform. The first arm is rotatably coupled to a first carriage, the second arm is rotatably coupled to a second carriage and the reel handler further comprises a sheath that connects the first carriage to the second carriage. The sheath comprises hydraulic cylinders positioned therein. The cylinders are configured to move the first carriage relative to the second carriage to move the brackets between the first and second configurations.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

The exemplary embodiments of a reel handler system and related methods of use are discussed in terms of devices for lifting and loading cable reels on to a truck bed or the like. The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a reel handler system, related components and methods of employing the reel handler system in accordance with the principles of the present disclosure. Alternate embodiments are also disclosed. Reference will now be made in detail to the exemplary embodiments of the present disclosure, which are illustrated in the accompanying figures. Turning to FIGS. 1-14, there are illustrated components of a reel handler 20.

In some embodiments, reel handler 20 is configured to be attached to a vehicle, such as, for example, a truck or trailer having a platform. Reel handler 20 is mounted to the vehicle such that reel handler 20 can lift a reel that is positioned on the platform off of the platform and rotate the reel to wind cable onto the reel or unwind cable from the reel, as discussed herein.

The components of reel handler system 20 can be fabricated from materials including metals, polymers and/or composites, depending on the particular application. For example, the components of system 20, individually or collectively, can be fabricated from materials such as aluminum, steel, iron, stainless steel, titanium, titanium alloys, cobalt-chrome, stainless steel alloys, semi-rigid and rigid materials, plastics, elastomers, rubbers and/or rigid polymers. Various components of system 20 may have material composites, including the above materials, to achieve various desired characteristics such as strength, rigidity, elasticity, performance and durability. The components of system 20, individually or collectively, may also be fabricated from a heterogeneous material such as a combination of two or more of the above-described materials. The components of system 20 can be extruded, molded, injection molded, cast, pressed and/or machined. The components of system 20 may be monolithically formed, integrally connected or include fastening elements and/or instruments, as described herein.

Figure 3:
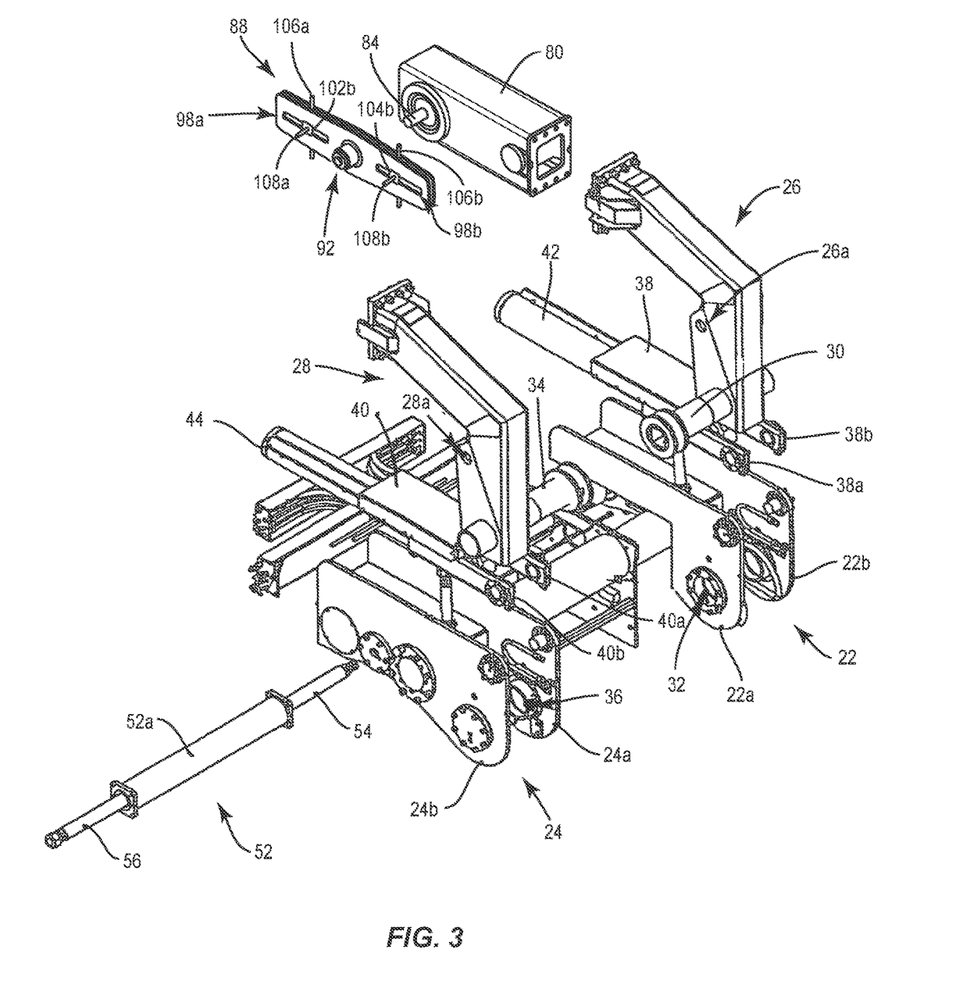
FIG. 3 is a perspective view of components of the reel handler shown in FIG. 1, with parts separated.

Reel handler 20 includes a first carriage 22 and a second carriage 24. Carriage 22 includes an inner wall 22a and an outer wall 22b and carriage 24 includes an inner wall 24a and an outer wall 24b. A first arm 26 is positioned between walls 22a, 22b and a second arm 28 is positioned between walls 24a, 24b. An axle 30 is fixed to arm 26, as shown in FIG. 3. Axle 30 is positioned within an aperture 32 of carriage 22 that extends through walls 22a, 22b of carriage 22 to allow arm 26 to rotate relative to carriage 22 about an axis defined by axle 30. An axle 34 is fixed to arm 28, as also shown in FIG. 3. Axle 34 is positioned within an aperture 36 of carriage 24 that extends through walls 24a, 24b of carriage 24 to allow arm 28 to rotate relative to carriage 24 about an axis defined by axle 34. Aperture 32 is coaxial with aperture 34.

Figure 1:
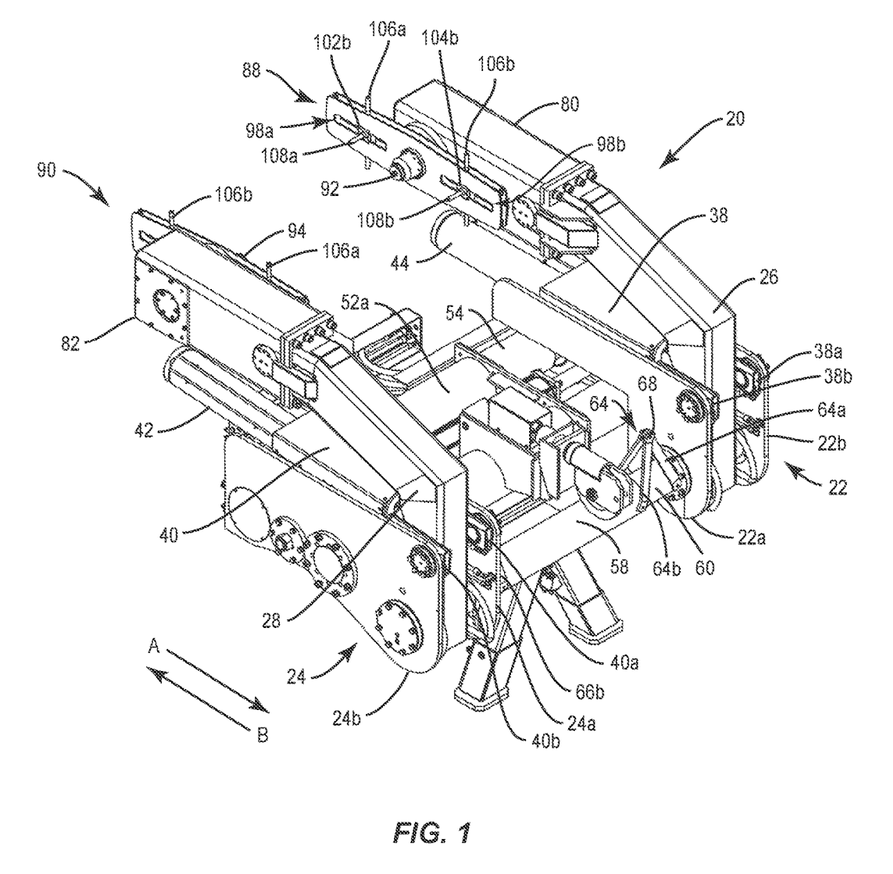
FIG. 1 is a perspective view of one embodiment of a reel handler in accordance with the principles of the present disclosure.

Reel handler 20 includes a lift member 38 coupled to carriage 22 and a lift member 40 coupled to carriage 24. As shown in FIGS. 1 and 3, lift member 38 is positioned between walls 22a, 22b of carriage 22 and lift member 40 is positioned between walls 24a, 24b of carriage 24. In some embodiments, lift members 38, 40 are hydraulic lifts, as discussed herein. Lift member 38 includes a pair of spaced apart supports 38a, 38b and lift member 40 includes a pair of spaced apart supports 40a, 40b. Support 38a is coupled to wall 22a and support 38b is coupled to wall 22b to fix lift member 38 to carriage 22. Support 40a is coupled to wall 24a and support 40b is coupled to wall 24b to fix lift member 40 to carriage 24. Arm 26 is positioned between supports 38a, 38b and arm 28 is positioned between supports 40a, 40b. In some embodiments, rods or pins extend through walls 22a, 22b and into supports 38a, 38b to couple lift member 38 to carriage 22 and through walls 24a, 24b and into supports 40a, 40b to couple lift member 40 to carriage 24. In such embodiments, the rods or pins are spaced apart from arms 26, 28 to allow arms 26, 28 to rotate or pivot relative to carriages 22, 24, as discussed herein. That is, the rods or pins do not extend into arm 26 or arm 28.

A piston 42 is movably positioned within lift member 38 and a piston 44 is movably positioned within lift member 40. Piston 42 is coupled to arm 26 and piston 44 is coupled to arm 28. In some embodiments, a rod or pin extends through piston 42 and an opening 26a in arm 26 to couple piston 42 to arm 26 and through piston 44 and an opening 28a in arm 28 to couple piston 44 to arm 28. Piston 42 is movable relative to lift member 38 in opposite directions along a longitudinal axis defined by piston 42 and piston 44 is movable relative to lift member 40 in opposite directions along a longitudinal axis defined by piston 44. For example, moving pistons 42, 44 relative to lift members 38, 40 in a first direction, such as, for example, the direction shown by arrow A in FIG. 1 causes arms 26, 28 to rotate about the axes defined by axles 30, 32 in a first rotational direction, such as, for example, clockwise and moving pistons 42, 44 relative to lift members 38, 40 in an opposite direction, such as, for example, the direction shown by arrow B in FIG. 1 causes arms 26, 28 to rotate about the axes defined by axles 30, 32 in an opposite rotational direction, such as, for example, counterclockwise. In some embodiments, lift members 38, 40 include hydraulics that move pistons 42, 44 relative to lift members 38, 40 in the first and second directions.

Figure 13:
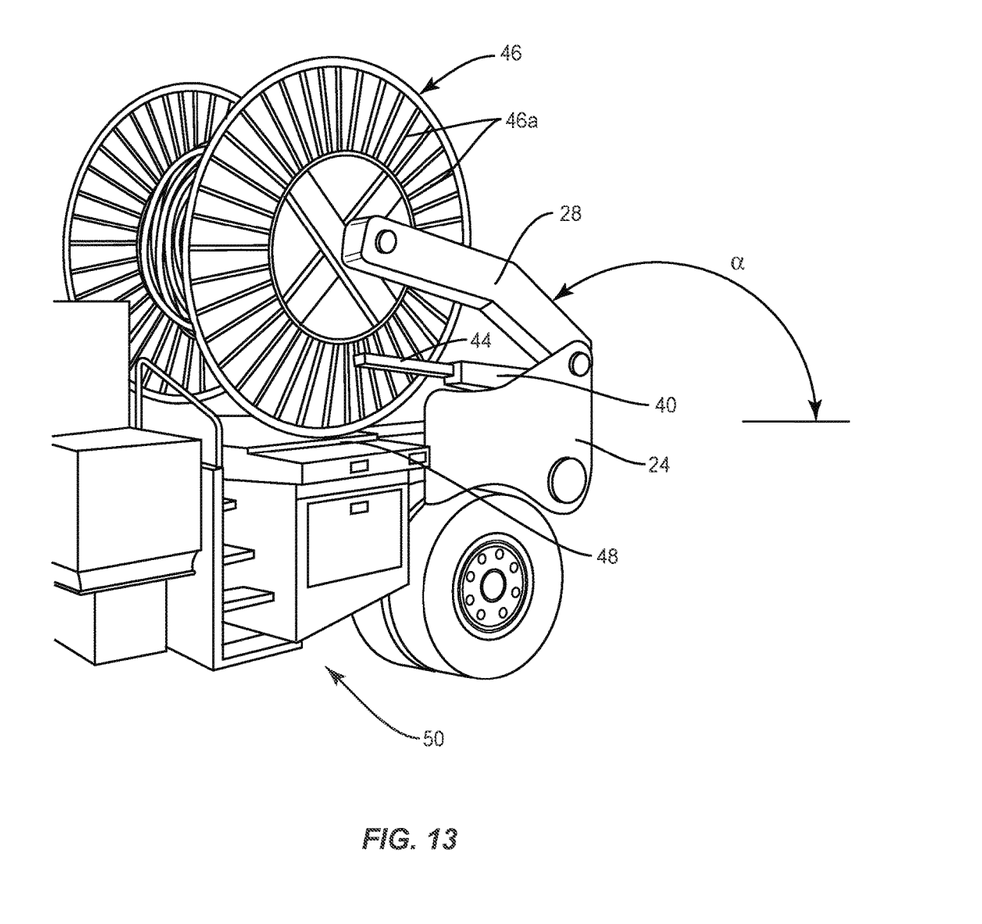
FIG. 13 is a perspective view of one embodiment of a reel handler in accordance with the principles of the present disclosure, with the reel handler in a first orientation.
Figure 14:
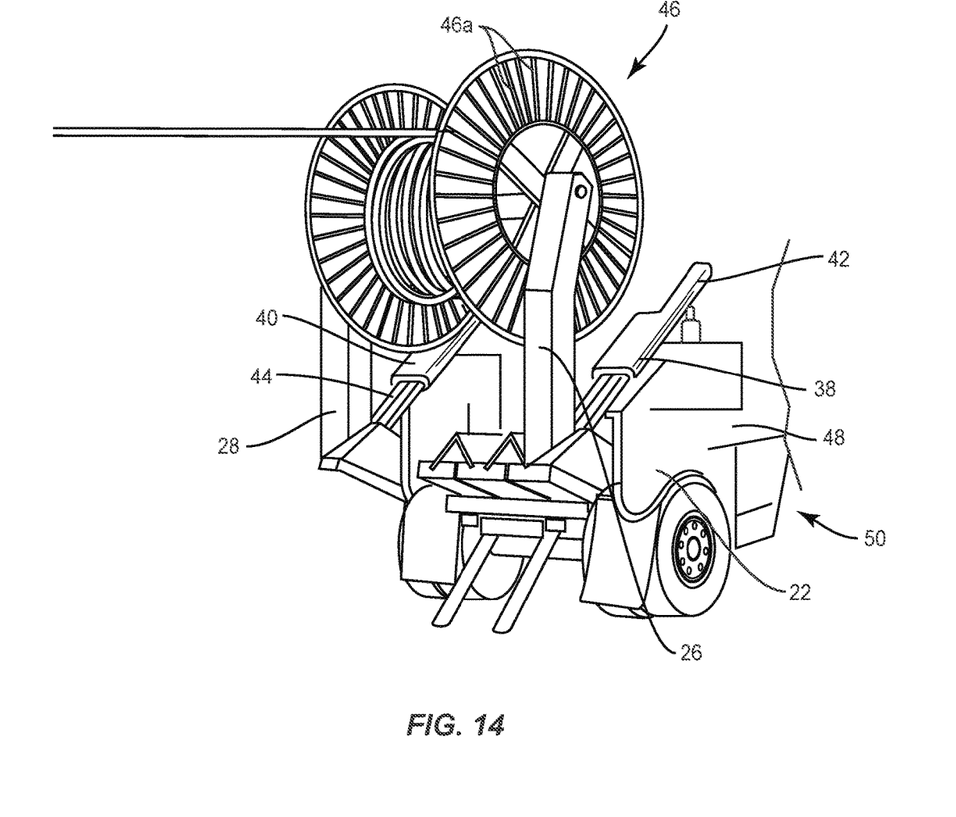
FIG. 14 is a perspective view the reel handler shown in FIG. 13, with the reel handler in a second orientation.

In some embodiments, arms 26, 28 are rotatable relative to carriages 22, 24 in an arc defined by an angle α to move arms 26, 28 between a first orientation shown in FIG. 13 and a second orientation shown in FIG. 14. In some embodiments, a cable reel, such as, for example, reel 46 is positioned on a platform 48 of a vehicle, such as, for example, vehicle 50, when arms 26, 28 are in the first orientation, as shown in FIG. 13. As arms 26, 28 move from the first orientation to the second orientation, arms 26, 28 lift reel 46 off of platform 48 such that reel 46 is spaced apart from platform 48, as shown in FIG. 14. This allows reel 46 to be rotated relative to arms 26, 28 to wind cable or wire onto reel 46 or unwind cable or wire from reel 46, as discussed herein. In some embodiments, angle α is an angle between about 140° and about 180°. In some embodiments, angle α is about 160°. As would be apparent to one of ordinary skill in the art, arms 26, 28 may be in various positions between the first and second orientations discussed above by selectively moving pistons 42, 44 in different amounts in the first direction or the second direction. That is, pistons 42, 44 may be moved in the first direction or the second direction to move arms 26, 28 to any position within the arc defined by angle α.

Figure 11:
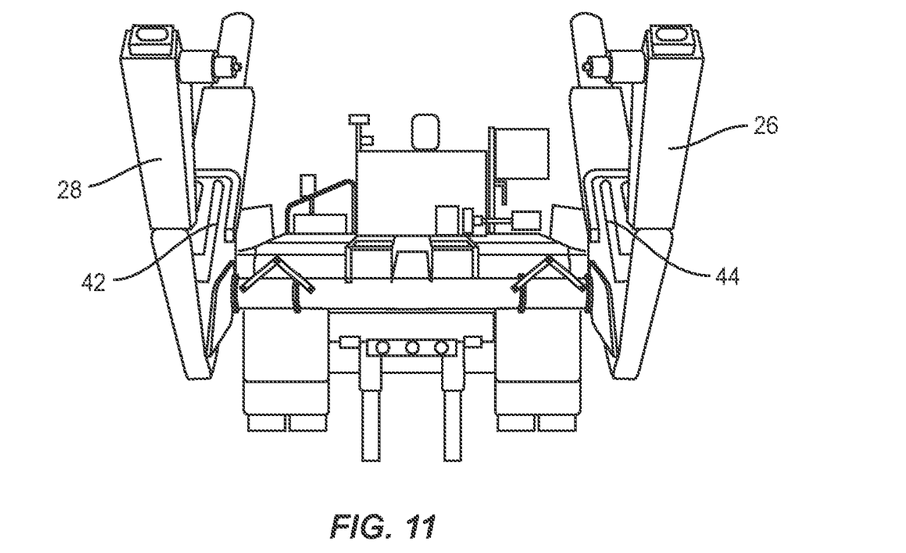
FIG. 11 is a front view of one embodiment of a reel handler in accordance with the principles of the present disclosure, with the reel handler in a first configuration.
Figure 12:
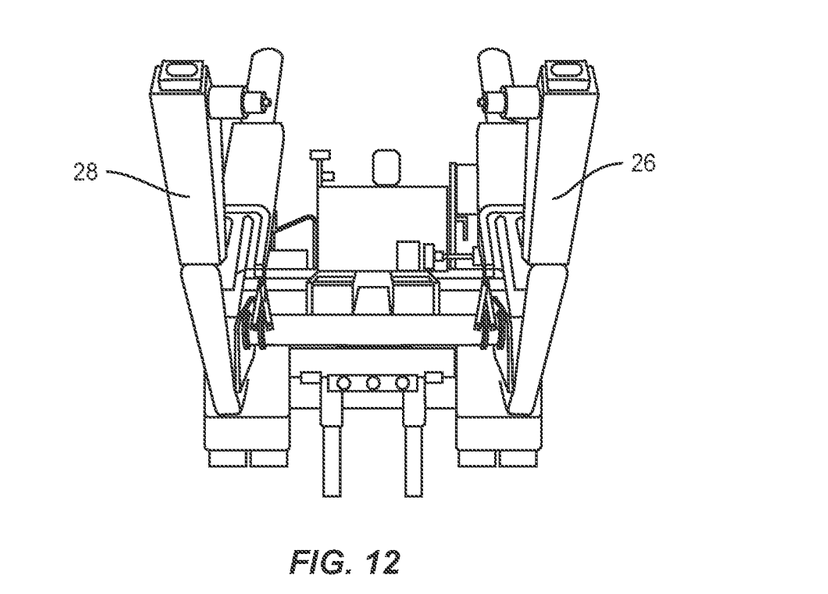
FIG. 12 is a front view the reel handler shown in FIG. 11, with the reel handler in a second configuration.

Reel handler 20 includes a sheath 52 positioned between carriages 22, 24. Sheath 52 includes a hollow body 52a having a passageway that extends through the entire length of body 52a. Sheath 52 includes a first cylinder 54 movably positioned within one end of the passageway in body 52a and a second cylinder 56 movably positioned within an opposite end of the passageway in body 52a. Cylinder 54 is coupled to carriage 22 and cylinder 56 is coupled to carriage 24. In some embodiments, reel handler 20 includes hydraulics to move cylinders 54, 56 in opposite directions along an axis defined by body 52a of sheath 52 to move arms 26, 28 toward one another or away from one another. This allow arms 26, 28 to move between a first configuration in which arms 26, 28 are spaced apart a first distance from one another, as shown in FIG. 11, and a second configuration in which arms 26, 28 are spaced apart a second distance from one another, as shown in FIG. 12. Reel 46 may be positioned between arms 26, 28 when arms 26, 28 are in the first configuration. Arms 26, 28 may then be moved from the first configuration to the second configuration to engage arms 26, 28 with reel 46. Once arms 26, 28 engage reel 46, arms 26, 28 may be rotated relative to carriages 22, 24 in the arc defined by angle α by moving pistons 42, 44 relative to lift members 38, 40 in the first direction to move arms 26, 28 from the first orientation shown in FIG. 13 and the second orientation shown in FIG. 14, as discussed herein.

Reel handler 20 includes a hollow sleeve 58. Reel handler 20 includes first and second members 60, 62 movably positioned within sleeve 58. Member 60 is coupled to wall 22a of carriage 22 to fix member 60 to carriage 22 and member 62 is coupled to wall 24a of carriage 24 to fix member 62 to carriage 24. Members 60, 62 move within sleeve 58 as arms 26, 28 toward one another or away from one another by moving cylinders 54, 56 in opposite directions along an axis defined by body 52a of sheath 52. A first bracket 64 includes a link 64a coupled to member 60 and link 64b coupled to sleeve 68. A second bracket 66 includes a link 66a coupled to member 62 and link 66b coupled to sleeve 68. Brackets 64, 66 function to maintain members 60, 62 within sleeve 58 and allow members 60, 62 to move in and out of sleeve 58 in unison, as discussed herein.

Figure 5:
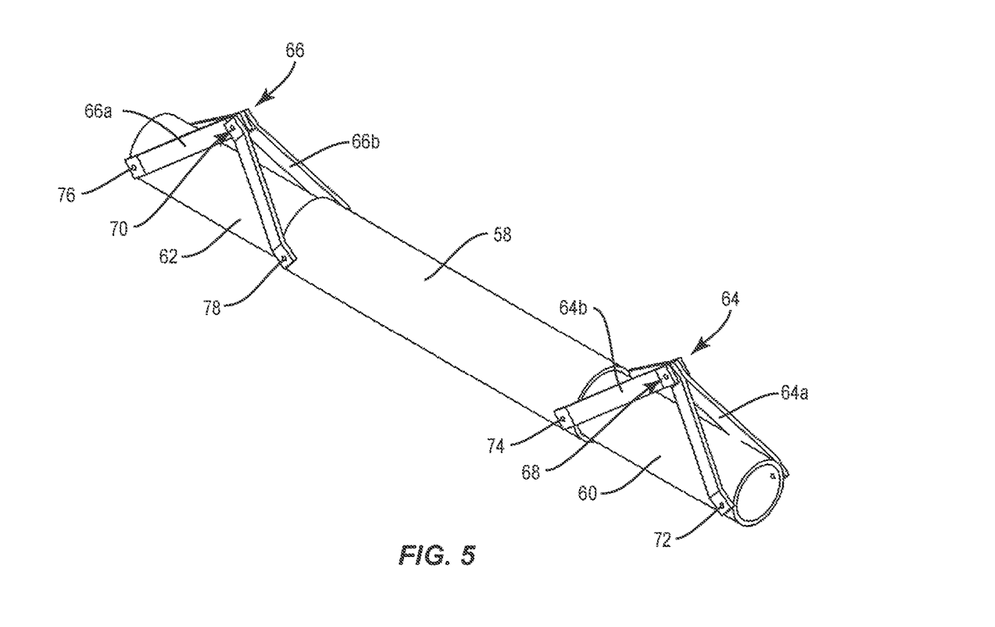
FIG. 5 is a perspective view of components of the reel handler shown in FIG. 1.

In some embodiments, links 64a, 64b each include a pair of links wherein one of links 64a is coupled to a front portion of member 60, one of links 64a is coupled to a back portion of member 60, one of links 64b is coupled to a front portion of sleeve 58 and one of links 64b is coupled to a back portion of sleeve 58. In such embodiments, links 64a are positioned between links 64b, as shown in FIG. 5, for example. Likewise, in some embodiments, links 66a, 66b each include a pair of links wherein one of links 66a is coupled to a front portion of member 62, one of links 66a is coupled to a back portion of member 62, one of links 64b is coupled to the front portion of sleeve 58 and one of links 66b is coupled to the back portion of sleeve 58. In such embodiments, links 66a are positioned between links 66b, as also shown in FIG. 5, for example. However, it is envisioned that links 64b may be positioned between links 64a and that links 66b may be positioned between links 66a.

Links 64a, 64b are pivotable relative to one another about a pin 68 that extends through links 64a, 64b and links 66a, 66b are pivotable relative to one another about a pin 70 that extends through links 66a, 66b. In some embodiments, link 64a is pivotably coupled to member 60 by a pin 72 that extends through link 64a and into member 60 and link 64b is pivotably coupled to sleeve 58 by a pin 74 that extends through link 64b and into sleeve 58. Likewise, in some embodiments, link 66a is pivotably coupled to member 62 by a pin 76 that extends through link 66a and into member 62 and link 66b is pivotably coupled to sleeve 58 by a pin 78 that extends through link 66b and into sleeve 58. Pins 68, 72, 74 allow links 64a, 64b to pivot relative to one another and relative to member 60 and sleeve 58 as arms 26, 28 toward one another or away from one another. Likewise, pins 70, 76, 78 allow links 66a, 66b to pivot relative to one another and relative to member 62 and sleeve 58 as arms 26, 28 toward one another or away from one another.

Link 64a moves relative to link 64b and link 66a moves relative to link 66b as arms 26, 28 toward one another or away from one another by moving cylinders 54, 56 in opposite directions along an axis defined by body 52a of sheath 52. In particular, as arms 26, 28 move from the first orientation shown in FIG. 13 and the second orientation shown in FIG. 14, brackets 64, 66 move from a first position shown in FIGS. 4 and 5 to a second position shown in FIGS. 6 and 7. As brackets 64, 66 move from the first position to the second position link 64a pivots relative to member 60 about pin 72 and link 64b pivots relative to sleeve 58 about pin 74, while link 64a pivots relative to link 64b about pin 68. Likewise, link 66a pivots relative to member 62 about pin 76 and link 66b pivots relative to sleeve 58 about pin 78, while link 66a pivots relative to link 66b about pin 70.

Figure 4:
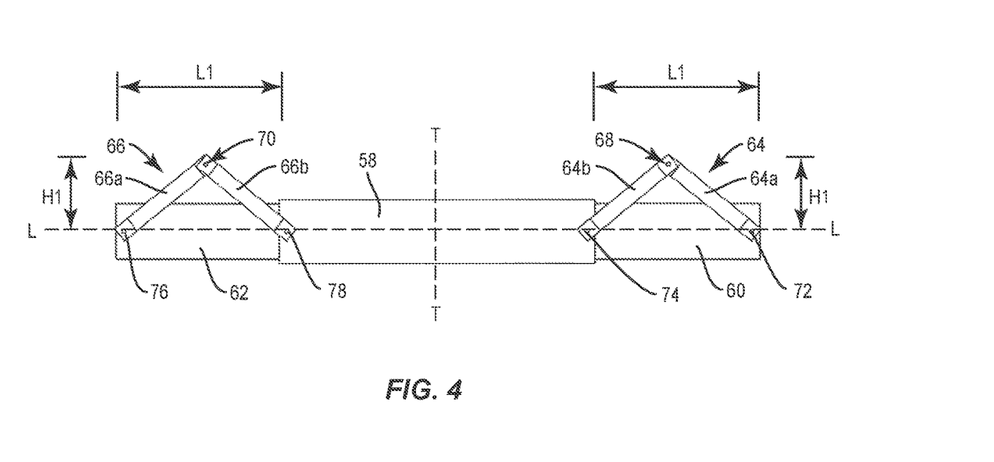
FIG. 4 is a front view of components of the reel handler shown in FIG. 1.
Figure 6:
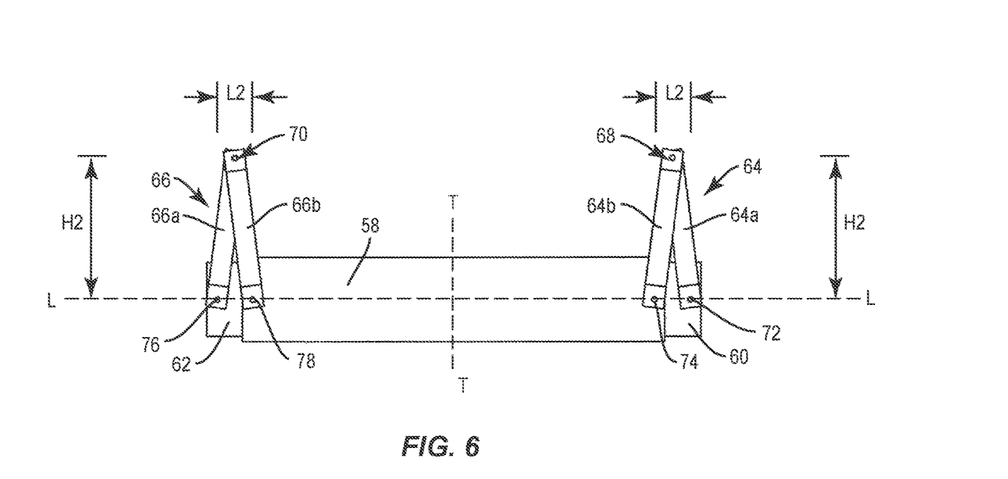
FIG. 6 is a front view of components of the reel handler shown in FIG. 1.
Figure 7:
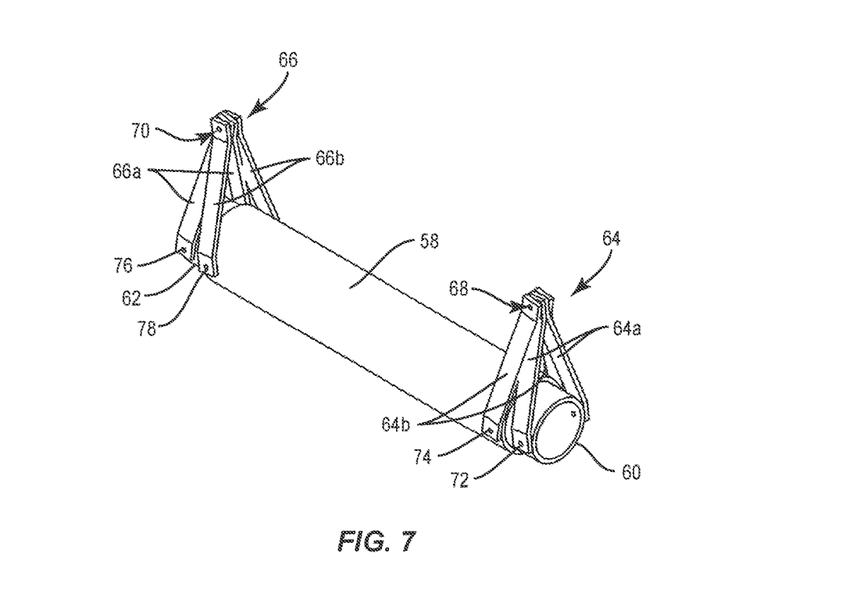
FIG. 7 is a perspective view of components of the reel handler shown in FIG. 1.
Figure 8:
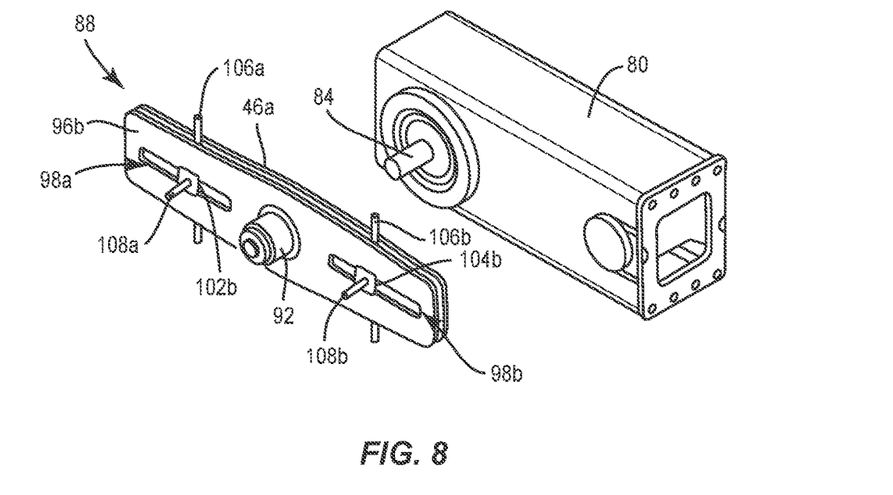
FIG. 8 is a perspective view of components of the reel handler shown in FIG. 1.
Figure 9:
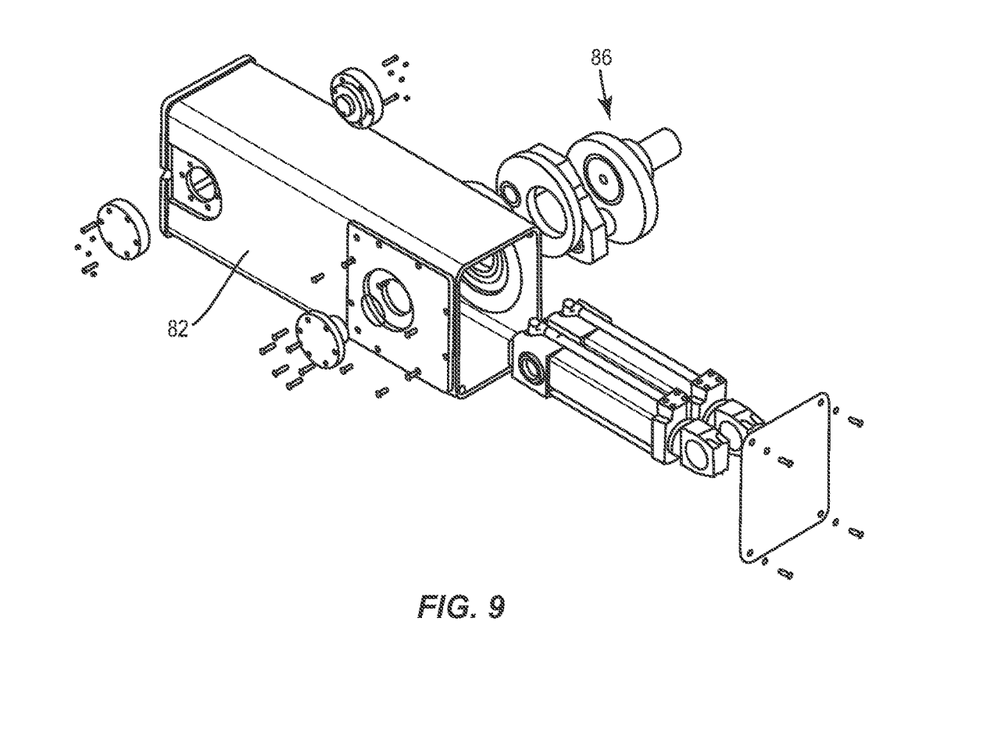
FIG. 9 is a perspective view of components of the reel handler shown in FIG. 1, with parts separated.
Figure 10:
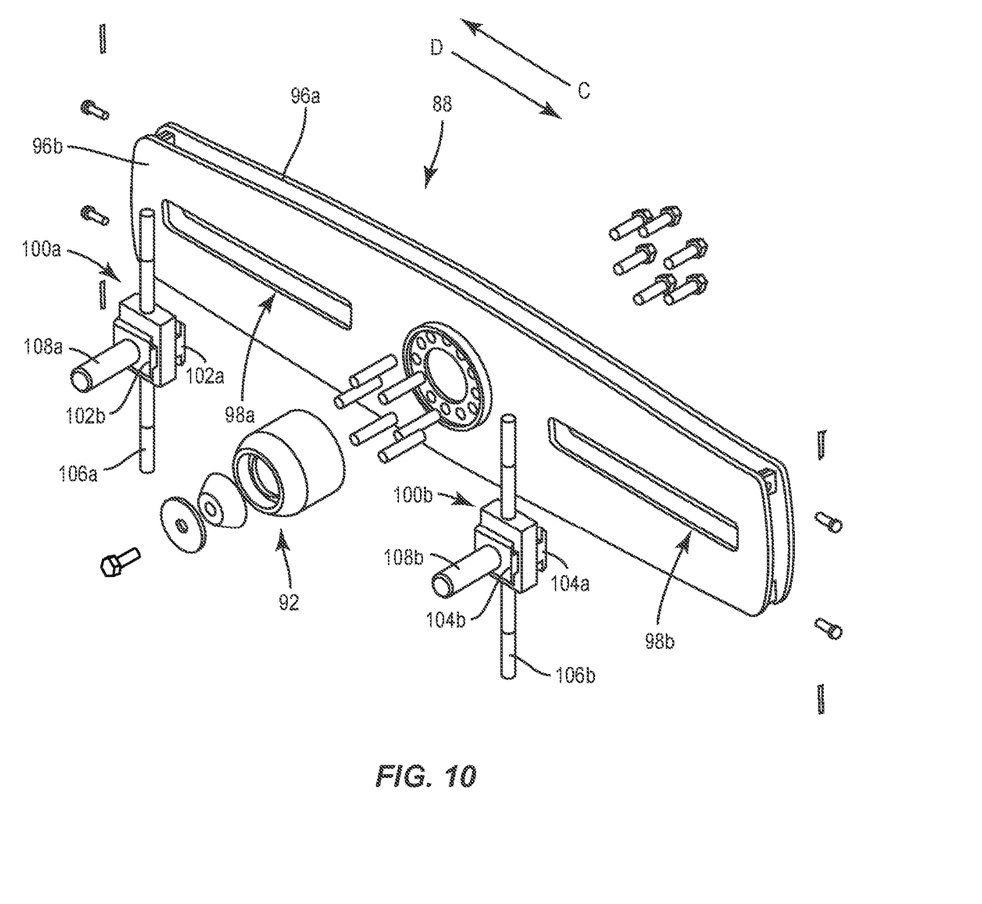
FIG. 10 is a perspective view of components of the reel handler shown in FIG. 1, with parts separated.

When brackets 64, 66 are in the first position, brackets 64, 66 each have a first length L1 along a longitudinal axis L defined by sleeve 58, as shown in FIG. 4. When brackets 64, 66 are in the second position, brackets 64, 66 each have a decreased second length L2 along longitudinal axis L, as shown in FIG. 6. That is, when brackets 64, 66 are in the first position, pin 72 is spaced apart from pin 74 a distance that is equal to or approximately equal to first length L1 and pin 76 is spaced apart from pin 78 a distance that is equal or approximately equal to first length L1; when brackets 64, 66 are in the second position, pin 72 is spaced apart from pin 74 a distance that is equal to or approximately equal to second length L2 and pin 76 is spaced apart from pin 78 a distance that is equal or approximately equal to second length L2.

When brackets 64, 66 are in the first position, brackets 64, 66 each have a first height H1 along a transverse axis T that extends perpendicular to longitudinal axis L, as shown in FIG. 4. When brackets 64, 66 are in the second position, brackets 64, 66 each have an increased second height H2 along transverse axis T, as shown in FIG. 6. That is, when brackets 64, 66 are in the first position, pin 68 is spaced apart from member 60 and pin 70 is spaced apart from member 62 by a first distance and when brackets 64, 66 are in the second position, pin 68 is spaced apart from member 60 and pin 70 is spaced apart from member 62 by a second distance that is greater than the first distance.

Figure 2:
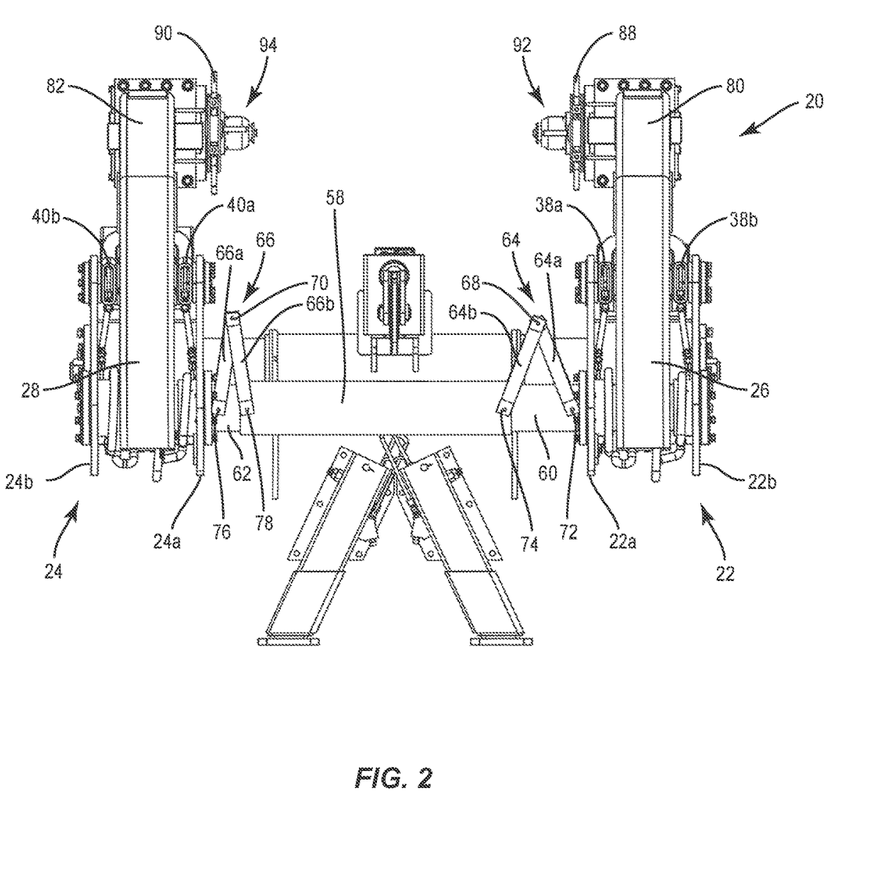
FIG. 2 is a front view of the reel handler shown in FIG. 1.

Movement of brackets 64, 66 when arms 26, 28 move in equal amounts toward one another or away from one another is described above. However, in some embodiments, one of arms 26, 28 may be moved toward or away from the other one of arms 26, 28 more than the other one of arms 26, 28. That is, one of cylinders 54, 56 may move along the axis defined by body 52a of sheath 52 more than the other one of cylinders 54, 56, thus causing one arm 26, 28 to be closer to sleeve 58 than the other one of arms 26, 28, as shown in FIG. 2. In such embodiments, the distance between pins 72, 74 of bracket 64 is different than the distance between pins 76, 78 of bracket 66. For example, where arm 28 is closer to sleeve 58 than arm 26 is to sleeve 58, the distance between pins 72, 74 of bracket 64 is greater than the distance between pins 76, 78 of bracket 66, as shown in FIG. 2, for example. This demonstrates that brackets 64, 66 can accommodate arms 26, 28 to be selectively moved relative to one another.

Arm 26 includes an end member 80 and arm 28 includes an end member 82. Member 80 is fixed to arm 26 and member 82 is fixed to arm 28. In some embodiments, members 80, 82 are connected to arms 26, 28 using bolts, for example, that extend through arm 26 and member 80 and through arm 28 and member 82. In some embodiments, arm 26 is integrally formed with member 80 and arm 28 is integrally formed with member 82 such that arms 26, 28 are each monolithic.

A connector 84 includes a first end positioned within member 80 and a cylindrical second end that extends outwardly from member 80. Connector 84 is rotatable relative to member 80 via a motor of reel handler 20 that rotates connector 84 relative to member 80. A connector 86 includes a first end positioned within member 82 and a cylindrical second end that extends outwardly from member 82. Connector 86 is rotatable relative to member 82 via a motor of reel handler 20 that rotates connector 86 relative to member 82. In some embodiments, the first ends of connectors 84, 86 include a cam that engages one of the motors to rotate the cams.

A support, such as, for example, an extension 88 is coupled to connector 84 and a support, such as, for example, an extension 90 is coupled to connector 86. In particular extension 88 includes a hub 92 that is positioned over the second end of connector 84 to fix extension 88 to connector 84 such that rotating connector 84 also rotates extension 88 and extension 90 includes a hub 94 that is positioned over the second end of connector 86 to fix extension 90 to connector 86 such that rotating connector 86 also rotates extension 90. Extensions 88, 90 each include a wall 96a and a wall 96b that is coupled to wall 96a. Spaced apart slots 98a, 98b each extend through wall 96a and wall 96b.

Extensions 88, 90 each include a first block 100a and a second block 100b. Block 100a includes first and second rails 102a, 102b. Upper and lower surfaces of rail 102a engage an inner surface of wall 96a that defines a first portion of slot 98a and upper and lower surfaces of rail 102b engage an inner surface of wall 96b that defines a second portion of slot 98a to allow block 100a to slide within slot 98a. Block 100b includes first and second rails 104a, 104b. Upper and lower surfaces of rail 104a engage an inner surface of wall 96a that defines a first portion of slot 98b and upper and lower surfaces of rail 104b engage an inner surface of wall 96b that defines a second portion of slot 98b to allow block 100b to slide within slot 98b. Block 100b is slidable within slot 98b in direction C and direction D shown in FIG. 10 between opposite ends of slot 98b.

A rod 106a extends through block 100a such that rod 106a is positioned between walls 96a, 96b and a rod 106b extends through block 100v such that rod 106b is positioned between walls 96a, 96b. Rods 106a, 106b extend above and below walls 96a, 96b such that rod 106a can be manipulated to slide block 100a in direction C and direction D shown between opposite ends of slot 98a and rod 106b can be manipulated to slide block 100b in direction C and direction D shown between opposite ends of slot 98b. A projection 108a extends outwardly from rail 102b of block 100a and a projection 108b extends outwardly from rail 104b of block 100b. Projection 108a extends through slot 98a and projection 108b extends through slot 98b. Projections 108a, 108b are configured to engage a reel, such as, for example, reel 46, as discussed herein. In some embodiments, projection 108a extends perpendicular to rod 106a and projection 108b extends perpendicular to rod 106b.

In operation and use, a cable reel, such as, for example, reel 46 is positioned between arms 26, 28 when arms 26, 28 are in the first configuration shown in FIG. 11. Arms 26, 28 are moved from the first configuration to the second configuration shown in FIG. 12 by moving cylinders 54, 56 toward one another along the axis defined by body 52a of sheath 52 to move arms 26, 28 toward one another such that projections 108a, 108b are each positioned between spokes 46a of reel 46 and hubs 92, 94 are positioned within sockets in reel 46 to engage arms 26, 28 with reel 46. In some embodiments, positioning projections 108a, 108b between spokes 46 prevents rotation of reel 46 relative to extensions 88, 90 such that reel 46 rotates upon rotation of extensions 88, 90, as discussed herein. Arms 26, 28 are rotated relative to carriages 22, 24 in the arc defined by angle α to move arms 26, 28 from the first orientation shown in FIG. 13 to the second orientation shown in FIG. 14 such that arms 26, 28 lift reel 46 off of platform 48 of vehicle 50 and reel 46 is spaced apart from platform 48, as shown in FIG. 14. Connectors 84, 86 are then rotated in a first rotational direction, such as, for example, clockwise, or a second rotational direction, such as, for example, counterclockwise to rotate hubs 92, 94 and/or extensions 88, 90 in the first rotational direction or the second rotational direction. As hubs 92, 94 and/or extensions 88, 90 rotate in the first rotational direction or the second rotational direction, reel 46 also rotates in the first rotational direction or the second rotational direction. In some embodiments, rotating reel 46 in the first rotational direction allows cable or wire to wind about reel 46 and rotating reel 46 in the second rotational direction allows cable or wire to unwind from reel 46. After the desired amount of cable or wire is wound onto reel 46 or unwound from reel 46, arms 26, 28 are rotated relative to carriages 22, 24 in the arc defined by angle α to move arms 26, 28 from the second configuration shown in FIG. 14 to the first orientation shown in FIG. 13 arms 26, 28 position reel 46 onto platform 48 of vehicle 50, as shown in FIG. 13.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A reel handler comprising:
   a first arm and a second arm;
   a first member coupled to the first arm and a second member coupled to the second arm;
   a sleeve having the members movably positioned therein;
   a first bracket having a first link coupled to the first member and a second link coupled to the sleeve, the links being pivotable relative to one another; and
   a second bracket having a third link coupled to the second member and a fourth link coupled to the sleeve, the third and fourth links being pivotable relative to one another,
   wherein the brackets are movable to increase and decrease a distance between the arms from a first configuration in which the brackets each have a first length along a longitudinal axis defined by the sleeve and a second configuration in which the brackets each have a decreased second length along the longitudinal axis.

2. A reel handler as recited in claim 1, wherein the members move away from one another as the brackets move from the first configuration to the second configuration.

3. A reel handler as recited in claim 1, wherein the members move relative to the sleeve in unison as the brackets move between the first and second configurations.

4. A reel handler as recited in claim 1, wherein the arms are spaced apart from the one another a first amount when the brackets are in the first configuration and are spaced apart from one another a second amount when the brackets are in the second configuration.

5. A reel handler as recited in claim 1, further comprising hubs that are coupled to the arms and a reel, wherein the hubs are spaced apart from the reel when the brackets are in the first configuration and are positioned within the reel when the brackets are in the second configuration, the hubs being rotatable relative to the arms.

6. A reel handler as recited in claim 1, wherein the brackets each have a first height when the brackets are in the first configuration and an increased second height when the brackets are in the second configuration.

7. A system comprising:
   the reel handler recited in claim 5; and
   a vehicle having a platform,
   wherein the arms are movable about an axis that is parallel to the sleeve in an arc, the arms being movable when the brackets are in the second configuration from a first position in which the reel engages the platform to a second position in which the reel is positioned above the platform.

8. A reel handler as recited in claim 5, wherein the reel comprises cable that is wound about a spool.

9. A reel handler as recited in claim 1, wherein the arms are rotatable about the longitudinal axis in an arc.

10. A reel handler as recited in claim 1, further comprising hydraulic lifts that each comprise a piston therein, the pistons each being coupled to one of the arms such that the pistons move within the lifts to rotate the arms about an axis defined by the sleeve in an arc.

11. A reel handler as recited in claim 1, further comprising a first support that is rotatable relative to the first arm and a second support that is rotatable relative to the second arm, the first support being coupled to the first arm and the second support being coupled to the second arm.

12. A reel handler as recited in claim 11, further comprising motors coupled to each of the arms, the motors being configured to rotate the supports relative to the arms.

13. A reel handler as recited in claim 11, further comprising a reel, wherein the supports each include a hub and a pair of projections configured to extend into the reel to rotate the reel relative to the arms.

14. A reel handler as recited in claim 13, wherein the hubs and the projections are spaced apart from the reel when the brackets are in the first configuration and are positioned within the reel when the brackets are in the second configuration.

15. A reel handler as recited in claim 13, wherein the projections are slidably disposed in slots in the supports to move the projections of each of the supports toward and away from one another.

16. A reel handler as recited in claim 13, further comprising extensions that each extend outwardly from one of the arms, the hubs each being positioned within one of the extensions, the extensions being rotatable to the arms.

17. A reel handler as recited in claim 1, wherein the first arm is rotatably coupled to a first carriage, the second arm is rotatably coupled to a second carriage and the reel handler further comprises a sheath that connects the first carriage to the second carriage, the sheath comprising hydraulic cylinders positioned therein, the cylinders being configured to move the first carriage relative to the second carriage to move the brackets between the first and second configurations.

18. A reel handler as recited in claim 17, wherein the cylinders are double-acting cylinders configured to move carriages relative to one another in opposite first and second directions along the longitudinal axis.

19. A cable reel handler for use with vehicle having a platform for holding a reel, the cable reel handler comprising:
   a first arm and a second arm;
   a first member coupled to the first arm and a second member coupled to the second arm;
   a sleeve having the members movably positioned therein;
   a first bracket having a first link coupled to the first member and a second link coupled to the sleeve, the links being pivotable relative to one another;
   a second bracket having a third link coupled to the second member and a fourth link coupled to the sleeve, the third and fourth links being pivotable relative to one another; and
   hydraulic lifts that each comprise a piston therein, the pistons each being coupled to one of the arms such that the pistons move within the lifts to move the arms about an axis defined by the sleeve in an arc,
   wherein the brackets are movable to increase and decrease a distance between the arms from a first configuration in which the brackets each have a first length along a longitudinal axis defined by the sleeve and a second configuration in which the brackets each have a decreased second length along the longitudinal axis, and
   wherein the first arm is rotatably coupled to a first carriage, the second arm is rotatably coupled to a second carriage and the reel handler further comprises a sheath that connects the first carriage to the second carriage, the sheath comprising hydraulic cylinders positioned therein, the cylinders being configured to move the first carriage relative to the second carriage to move the brackets between the first and second configurations.

20. A cable reel system comprising:

a vehicle having a platform;

a reel; and a cable reel handler comprising:

a first arm and a second arm, a first member coupled to the first arm and a second member coupled to the second arm,    a sleeve having the members movably positioned therein,    a first bracket having a first link coupled to the first member and a second link coupled to the sleeve, the links being pivotable relative to one another,    a second bracket having a third link coupled to the second member and a fourth link coupled to the sleeve, the third and fourth links being pivotable relative to one another, and    hydraulic lifts that each comprise a piston therein, the pistons each being coupled to one of the arms such that the pistons move within the lifts to move the arms about an axis defined by the sleeve in an arc, wherein the brackets are movable to increase and decrease a distance between the arms from a first configuration in which the brackets each have a first length along a longitudinal axis defined by the sleeve and a second configuration in which the brackets each have a decreased second length along the longitudinal axis, wherein the arms are movable about an axis that is parallel to the sleeve in an arc, the arms being movable when the brackets are in the second configuration from a first position in which the reel engages the platform to a second position in which the reel is positioned above the platform, and wherein the first arm is rotatably coupled to a first carriage, the second arm is rotatably coupled to a second carriage and the reel handler further comprises a sheath that connects the first carriage to the second carriage, the sheath comprising hydraulic cylinders positioned therein, the cylinders being configured to move the first carriage relative to the second carriage to move the brackets between the first and second configurations.

* * * * *